US012468062B2

(12) United States Patent
Candy

(10) Patent No.: US 12,468,062 B2
(45) Date of Patent: Nov. 11, 2025

(54) METAL DETECTOR

(71) Applicant: Minelab Electronics Pty. Limited, Mawson Lakes (AU)

(72) Inventor: Bruce Halcro Candy, Mawson Lakes (AU)

(73) Assignee: Minelab Electronics Pty. Limited, Mawson Lakes (AU)

( * ) Notice: Subject to any disclaimer, the term of this patent is extended or adjusted under 35 U.S.C. 154(b) by 195 days.

(21) Appl. No.: 18/221,545

(22) Filed: Jul. 13, 2023

(65) Prior Publication Data

US 2024/0019598 A1 Jan. 18, 2024

(30) Foreign Application Priority Data

Jul. 14, 2022 (AU) ................................ 2022901968

(51) Int. Cl.
*G01V 3/10* (2006.01)

(52) U.S. Cl.
CPC ...................... *G01V 3/10* (2013.01)

(58) Field of Classification Search
CPC .......... G01V 3/10; G01V 3/104; G01V 3/107; H02J 50/10; H03K 9/08
See application file for complete search history.

(56) References Cited

U.S. PATENT DOCUMENTS

| | | |
|---|---|---|
| 7,924,012 B2 | 4/2011 | Candy |
| 9,348,053 B2 | 5/2016 | Candy |
| 9,829,598 B2 | 11/2017 | Candy |
| 2010/0141247 A1 | 6/2010 | Candy |
| 2014/0232408 A1 * | 8/2014 | Candy ................... G01V 3/104 324/329 |

FOREIGN PATENT DOCUMENTS

WO WO-2011156870 A1 * 12/2011 ............. G01V 3/104

OTHER PUBLICATIONS

Y. Das, "Effects of soil electromagnetic properties on metal detectors," in IEEE Transactions on Geoscience and Remote Sensing, vol. 44, No. 6, pp. 1444-1453, Jun. 2006 (Year: 2006).*

* cited by examiner

*Primary Examiner* — Daniel R Miller
(74) *Attorney, Agent, or Firm* — The Webb Law Firm

(57) ABSTRACT

Provided is a method to detect a target using a metal detector. The method includes transmitting a repeating sequence of transmitted magnetic field into an environment. The repeating sequence of transmitted magnetic field is generated by a repeating sequence of transmitted electrical current flowing through a transmit inductive winding such that the repeating sequence of transmitted electrical current includes at least a first period of rapid change of current, followed by a first period of non-zero approximately constant current. A transition time between the first period of rapid change of current and the first period of non-zero approximately constant current is controlled by a first value of an electrical current flowing through the transmit inductive winding during the first period of rapid change of current. The first value is determined by an output of a first negative feedback loop that measures at least part of the repeating sequence of transmitted electrical current flowing through the transmit inductive winding.

18 Claims, 6 Drawing Sheets

METAL DETECTOR

CROSS REFERENCE TO RELATED APPLICATION

This application claims priority to Australian Patent Application No. 2022901968 filed Jul. 14, 2022, the disclosure of which is hereby incorporated by reference in its entirety.

BACKGROUND OF THE INVENTION

Field of the Invention

The present disclosure relates to a metal detector.

Description of Related Art

The general forms of most metal detectors are either hand-held battery-operated units, conveyor-mounted units, or vehicle-mounted units. Examples of hand-held products include detectors used to locate gold, explosive land mines or ordnance, coins and treasure. Examples of conveyor-mounted units include fine gold detectors in ore mining operations, and an example of a vehicle-mounted unit includes a unit to locate buried land mines.

These metal detectors usually consist of transmit electronics generating a repeating transmit signal cycle of a fundamental period, that is applied to an inductor, for example a transmit inductive winding in a metal detector coil, which transmits a resulting varying magnetic field, sometimes referred to as a transmit magnetic field.

These metal detectors may also contain receive electronics that processes a receive signal from a measured receive magnetic field, during one or more receive periods during the repeating transmit signal cycle, and the receive signal is processed to produce an indicator output signal, the indicator output signal at least indicating the presence of at least a metal target within the influence of the transmit magnetic field.

Part of the signal processing of the receive signal consists of the receive signal being either sampled, or synchronously demodulated, to produce the indicator output signal.

This disclosure applies to time-domain metal detectors that may be thought of as having synchronous demodulators detecting specific periods of time usually following transitions in a transmitted signal. Examples of time-domain are well-known pulse-induction (PI) metal detectors, or PI-like metal detectors with periods of alternating constant transmitted magnetic fields with rapid magnetic field transitions connecting the alternate periods of constant transmitted magnetic fields.

Magnetic soils may have relatively high permeability, such that most of the soil sticks well to a magnet. Most of these magnetic materials consist of multi- or single-domain ferrites. Most of the single domain particles are too large to exhibit viscous remnant magnetism (VRM), but most magnetic soils do contain a significant quantity of VRM superparamagnetic particles with mostly log-uniform frequency distribution over typical multi-frequency or time-domain metal detector detection bandwidths, but usually with a small log-linear distribution component as well. The ratio of non-VRM to VRM components varies from location to location, crudely approximated as a 1/(displacement) random distribution relationship. The received signal from the magnetic soils may be many thousands of times higher than the signal from a relatively deeply buried target, and hence the soil signals need to be "ground-balanced", meaning the soil signals need to be nulled-out using signal processing, in order to detect such a metal target. It is recognised in the industry that multi-period transmitting PI metal detectors have an advantage over single period PI metal detectors.

SUMMARY OF THE INVENTION

According to a first aspect of the present disclosure, there is provided a method to detect a target using a metal detector, the method comprising: transmitting a repeating sequence of transmitted magnetic field into an environment, the repeating sequence of transmitted magnetic field is generated by a repeating sequence of transmitted electrical current flowing through a transmit inductive winding such that the repeating sequence of transmitted electrical current comprises at least a first period of rapid change of current, followed by a first period of constant current; wherein a transition time between the first period of rapid change of current and the first period of non-zero constant current is controlled by a first value of an electrical current flowing through the transmit inductive winding during the first period of rapid change of current; and wherein the first value is determined by an output of a first negative feedback loop that measures at least part of the repeating sequence of transmitted electrical current flowing through the transmit inductive winding.

In one form, the first negative feedback loop measures at least part of a slope of the first period of constant current.

In one form, a second negative feedback loop controls a commencement of at least the first period of rapid change of current, such that a termination of the first period of rapid change of current is controlled to be in a fixed relationship to a timing clock controlling at least one receive synchronous demodulator that receives a receive signal from a receiver of the metal detector.

In one form, the repeating sequence of transmitted electrical current flowing through the transmit inductive winding comprises at least two different periods of approximately constant current, each being of different duration.

According to another aspect of the present disclosure, there is provided metal detector configured to perform the method of the first aspect or one of its various forms.

According to another aspect of the present disclosure, there is provided a non-transitory computer readable medium comprises instructions, wherein when the instructions are executed, the method of the first aspect or one of its various forms is performed.

The terms Fig., Figs., Figure, and Figures are used interchangeably in the specification to refer to the corresponding figures in the drawings.

BRIEF DESCRIPTION OF THE DRAWINGS

Embodiments of the present disclosure will be discussed with reference to the accompanying drawings wherein.

DESCRIPTION OF THE INVENTION

Figure 1:
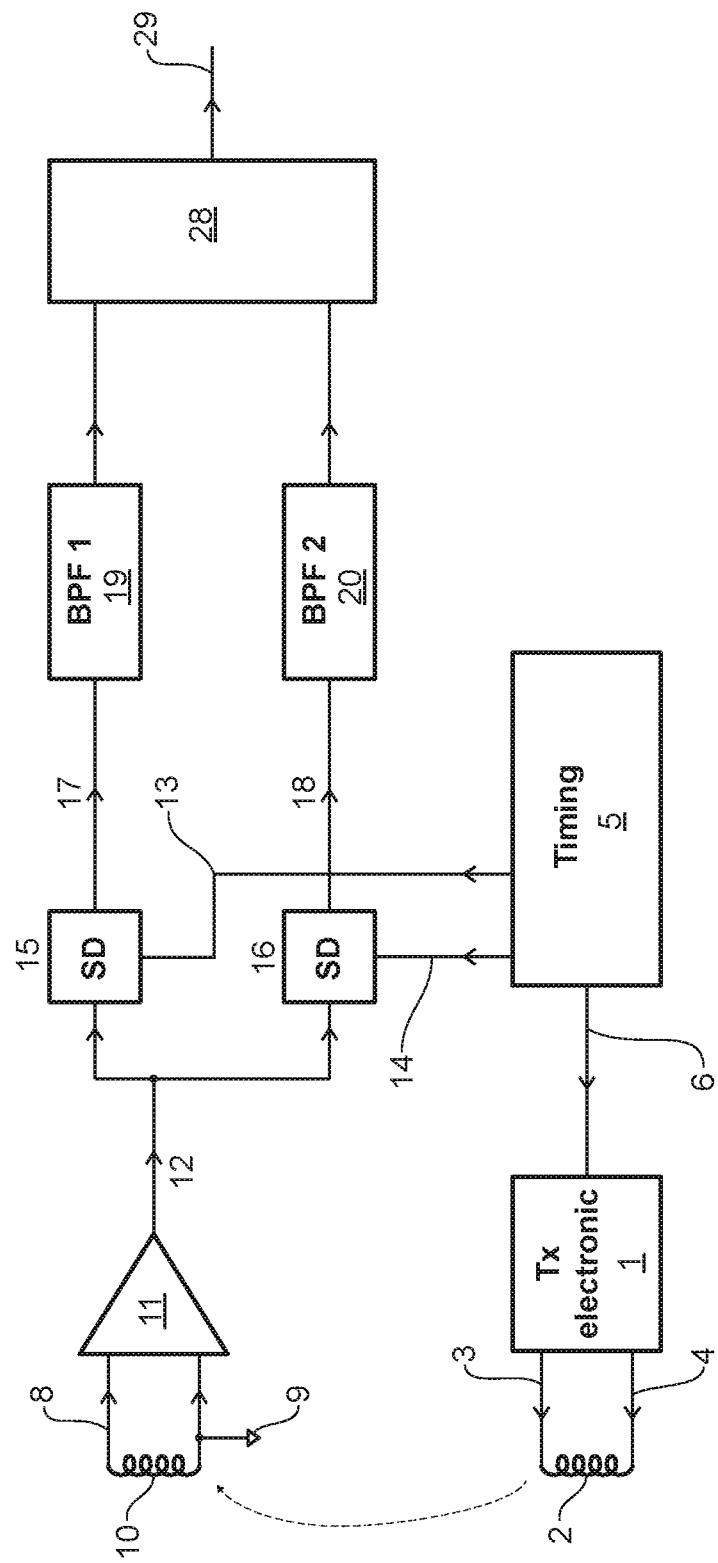
FIG. 1 is an example of a prior art metal detector for magnetic soils.

All fit-for-purpose high-end commercial "gold" metal detectors have ground-balancing capabilities. FIG. 1 shows an example block diagram of their basic operation for a sensing coil with separate transmit inductive winding and receive inductive winding. A transmit inductive winding 2, transmits a varying repeating sequence of transmitted magnetic field due to a repeating sequence of transmitted electrical current flowing through the transmit inductive winding 2, in response to transmit electronics 1 applying a transmit signal at nodes 3 and 4. The waveform of the transmit signal at nodes 3 and 4 are controlled by a master clock and timing generator 5, via a connection 6. A varying receive magnetic field from an environment subjected to the varying transmitted magnetic field induces a receive signal at 8, induced in an inductive receive winding 10. The term "environment" simply refers to an area of influence of the transmitted magnetic field, and during an operation of a metal detector, it often comprises air and soil.

One end of the inductive receive winding 10 is connected to the electronics ground 9. The receive signal at 8 is amplified by an amplifier 11 to produce an amplified output signal at 12, that is applied to inputs of synchronous demodulators 15 and 16. The transfer function of these, are controlled by the master clock and timing generator 5 via 13 and 14 connections respectively. An output 17 of the synchronous demodulator 15 is fed to band-pass filter 19 and an output 18 of the synchronous demodulator 16 is fed to band-pass filter 20. A bandpass of these bandpass filters may be 0.5 Hz to 4 Hz for example, and thus their outputs in effect will be devoid of transmit related frequency components that have fundamental frequencies usually in the kilohertz range. Alternatively, the filters 19 and 20 may be low pass-filters. The transfer function of synchronous demodulators 15 and 16 are both selected to effect groundbalance, and, both have different transfer functions. Outputs of filters 19 and 20 are then further processed by processor 28 to produce an indicator output signal 29, indicating the presence of a metal target being detected by the metal detector.

Figure 2:
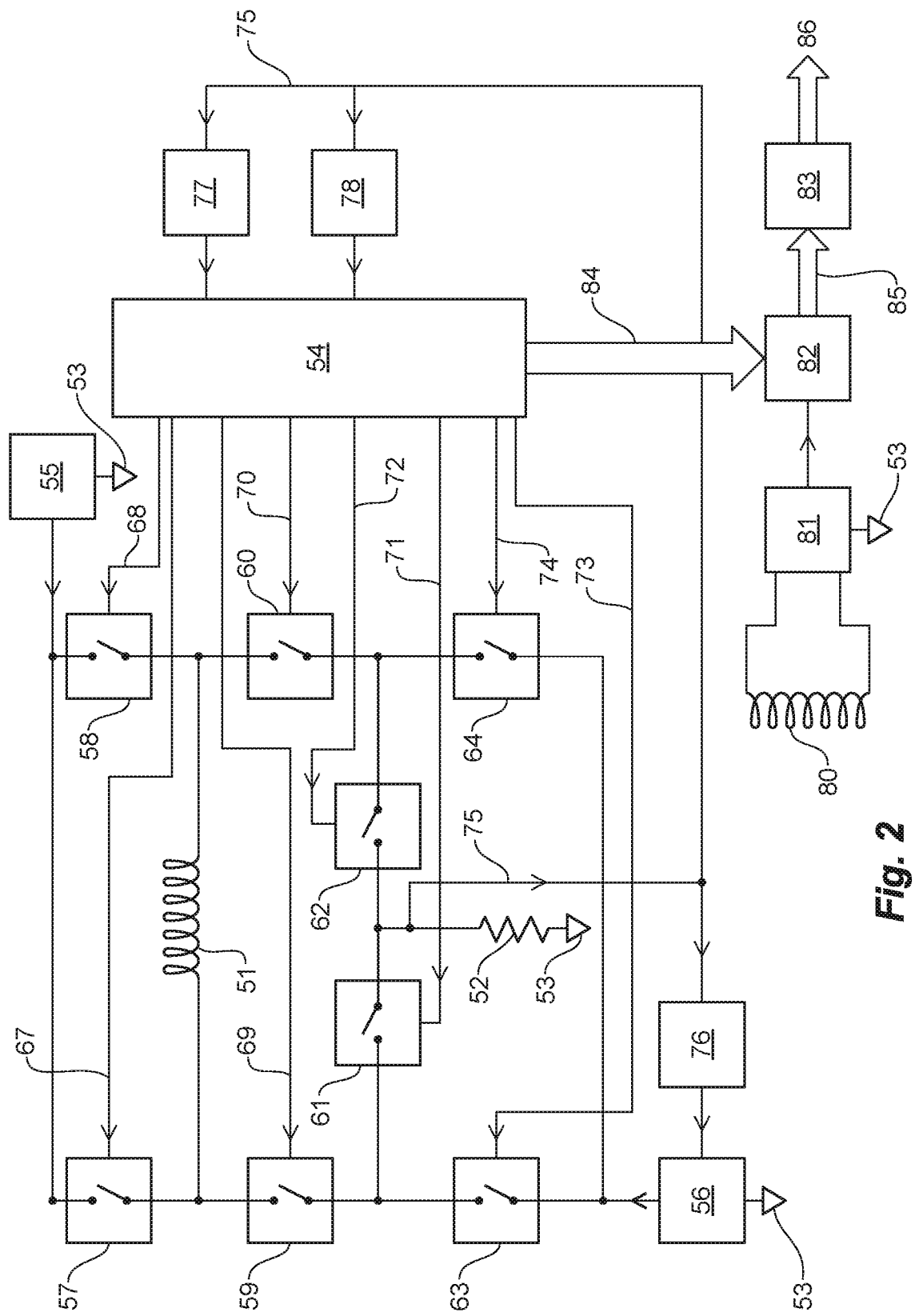
FIG. 2 is an example transmitter of a prior art metal detector that transmits alternating periods of approximately constant current flowing through the transmit inductive winding and periods of rapid change of current flowing through the transmit inductive winding.
Figure 3:
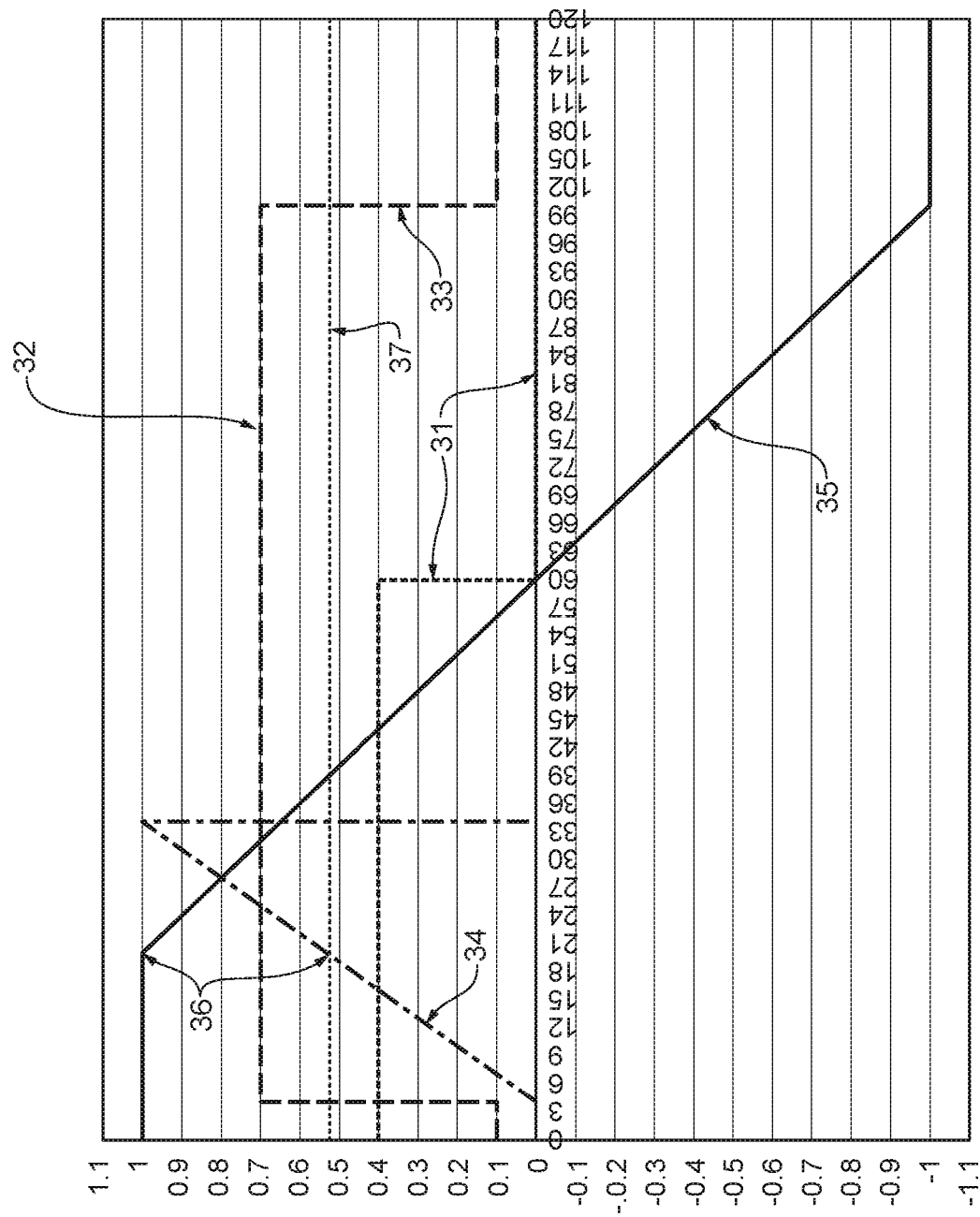
FIG. 3 shows exemplary signal and control waveforms for the block diagram transmitter in FIG. 2.

FIG. 2 shows an extant example block diagram of a transmitter, and FIG. 3 the control waveforms of this transmitter that produces periods of approximately constant current flowing through the transmit inductive winding of the metal detector coil. Here the term "approximately constant current" is clarified. The "approximately constant current" is not literally constant but is distorted away from being ideally constant due to several different mechanisms, namely:

(i) Decaying eddy currents in the current paths of the transmitted current within electronics PCB, coil connector, solder joints and various other metals close to current paths of this transmitted current;

(ii) The effects of any other energy loss mediums or "targets" coupled to the transmitted magnetic field, and thus modulating the complex inductance of the transmit inductive winding such as: conductive soils, detected metal targets, and soils containing VRM magnetic components;

(iii) Varying feedback control of these constant current periods by negative feedback loops in response to (a) electronic noise, (b) changes in response to the said energy loss sources listed in (i) and (ii), that modulate the complex inductance of the transmit inductive winding as the coil is swept over the said soil and/or targets; and (iv) Electronics inaccuracies.

Sources (i) and (ii) add "decaying" signals to the constant current period that, by definition, are not constant in value. Further, suppose the complex inductance of the transmit inductive winding is being variably modulated as the transmit inductive winding is being passed over varying susceptibility magnetic soils (through an operator swinging the coil from side-to-side over the soil for example): The negative feedback loop will then have its input measurements affected by this change in inductance and will endeavour to correct in accordance to the response time of the said negative feedback loop. Thus, the degree of the "constancy" of the constant current period may vary according to the response time of the said negative feedback loop. Source (iv) simply causes an inaccuracy to the constant current slope away from zero.

Thus, the term herein "approximately constant current" periods is constrained to include the non-ideal behaviours described above. The term "zero-reactive voltage period" (with finite transmitted current) may also be used to describe the "approximately constant current" periods, but it too cannot literally be "zero-reactive voltage" due to exactly the same reasons given above, as would be understood by a person skilled in the art. In one interpretation, "approximately constant current" is with a very minor deviation or slope of not more than 1%.

Referring to FIGS. 2 and 3, a high voltage power supply 55 (e.g. 180V) is connected to the "high-side" of a H-bridge switch consisting of switches 57, 58, whilst the "low side" switches of the H-bridge are switches 59 and 60 and this bridge directs the current flow in the transmit inductive winding 51. Switch 59 is connected to switches 61 and 63, while switch 60 is connected to switches 62 and 64. Switches 61 and 62 are connected to a low valued resistor 52 (e.g., 50 milliohms), that is used to sense the transmit inductive winding current, and the low valued resistor 52 and high voltage power supply 55 are both connected to the metal detector electronics ground 53. Switches 63 and 64 are connected to a low voltage supply 56 (e.g. 0.75V), whose voltage is set by an output of a fourth negative feedback loop integrator 76, wherein the fourth negative feedback loop integrator 76 senses a voltage at node 75 that is proportional to the current flowing through resistor 52 such that the fourth negative feedback loop sets an average current for the constant current periods. The low voltage supply 56 is also connected to the metal detector electronics ground 53. When switch 61 is switched "on" (e.g. "on" being low resistance such as Ohms), switch 64 is switched on whilst switches 62 and 63 are switched off (effectively "infinity" Ohms or open circuit), or, vice versa. These switches 61, 62, 63 and 64 are controlled by waveform 31 in FIG. 3. For the period of transmit inductive winding rapid change in current, either switches 57 and 60 are switched on whilst switches 58 and 59 are off (for a first polarity), or, switches 58 and 59 are switched on whilst switches 57 and 60 are off (for the opposite polarity to the first polarity). During the constant current periods, the low side switches 59 and 60 are on, and the high side switches 57 and 58 are off. The switching controls are generated in timing electronics 54, via 67, 68, 69, 70, 71, 72, 73 and 74. The slope of consecutive constant current periods is measured by negative feedback loop integrators 77 for one polarity and 78 for the opposite. Outputs of these negative feedback loop integrators 77 and 78, one of which is indicated by 37 in FIG. 3, control the commencement 36 of when the high voltage supply 55 is switched to the transmit inductive winding 51, relative to the high voltage termination control signal at time 33. The transmit current 35 flowing through the transmit inductive winding 51 and sensing resistor 52 has a high magnitude derivative during the "high voltage period" between times 36 and 33 (because $$\frac{LdI}{dt} = v)$$

and thus is a period of rapid change of current flowing through the transmit inductive winding 51 (labelled 2 in FIG. 1). For example: if L=0.3 mH, V=180V and the change in current 3A, then the time duration of the period rapid change of current flowing through the transmit inductive winding (between times 36 and 33 in FIG. 3) is 5 µs, and the rate of change of transmit winding current is 600 kA/s. The said commencement of the period of rapid change of current flowing through the transmit inductive winding 51 is determined by a comparison to an output 37 of the negative feedback loop integrators 77 or 78 (depending on polarity) and a pulse width modulator (PWM) ramp 34 that commences when control waveform 32 goes from low to high as shown in FIG. 3, which is controlled by a clock within timing electronics 54. Thus, the initial current of transmit inductive winding at the commencement of the constant current period (after time 33 in FIG. 3) is controlled to be approximately the voltage of the low voltage 56 supply output divided by the total series resistance of transmit signal driving electronics plus that of transmit inductive winding 51, taking all other losses such as coupled eddy currents, or VRM coupling into the transmit inductive winding, into account. Thus, if for example, the said total series resistance of transmit driving electronics plus transmit inductive winding 51 (including coil cable and connector) is 0.5 Ohms, then the low voltage supply is 0.75V assuming the positive polarity constant current period and negative polarity constant current period have the same magnitude current flows (1.5A each). The waveform 31 is a logic signal that determines the polarity of the slope of rapid change of current flowing through the transmit inductive winding and polarity of constant current periods. Thus, if the slope of the constant current period is not measured as zero, the relevant feedback loop integrating amplifier's output changes (i.e. level of output 37 in FIG. 3 changes) to adjust, when time 36 commences, to reduce the said slope to closer to zero.

However, as any error in one of the periods of constant current, within the repeating sequences of transmitted electrical current flowing through the transmit inductive winding, affects current flow in the periods ahead in time, thus, the negative feedback loops containing negative feedback loop integrators 77 and 78 are coupled. There may be advantages to transmitting multi-period repeating sequences of transmitted electrical current. For multi-period transmission, the feedback loop coupling becomes more overt, due to shorter periods, along with attendant reduction in feedback loop response times, and increases in negative feedback loop noise. Improving these undesirable features is the subject of this disclosure.

The timing electronics 54 also generates synchronous demodulator transfer function control signals at 84 that control receive synchronous demodulators 82, whose inputs are fed from an amplifier 81 whose input in turn is connected to a receive inductive winding 80. Amplifier 81 is connected to the metal detector electronics ground 53. Outputs 85 of the receive synchronous demodulators 82 are further processed in receive processing electronics 83 (including e.g. band-pass filters), that produces an indicator output 86.

Figure 4:
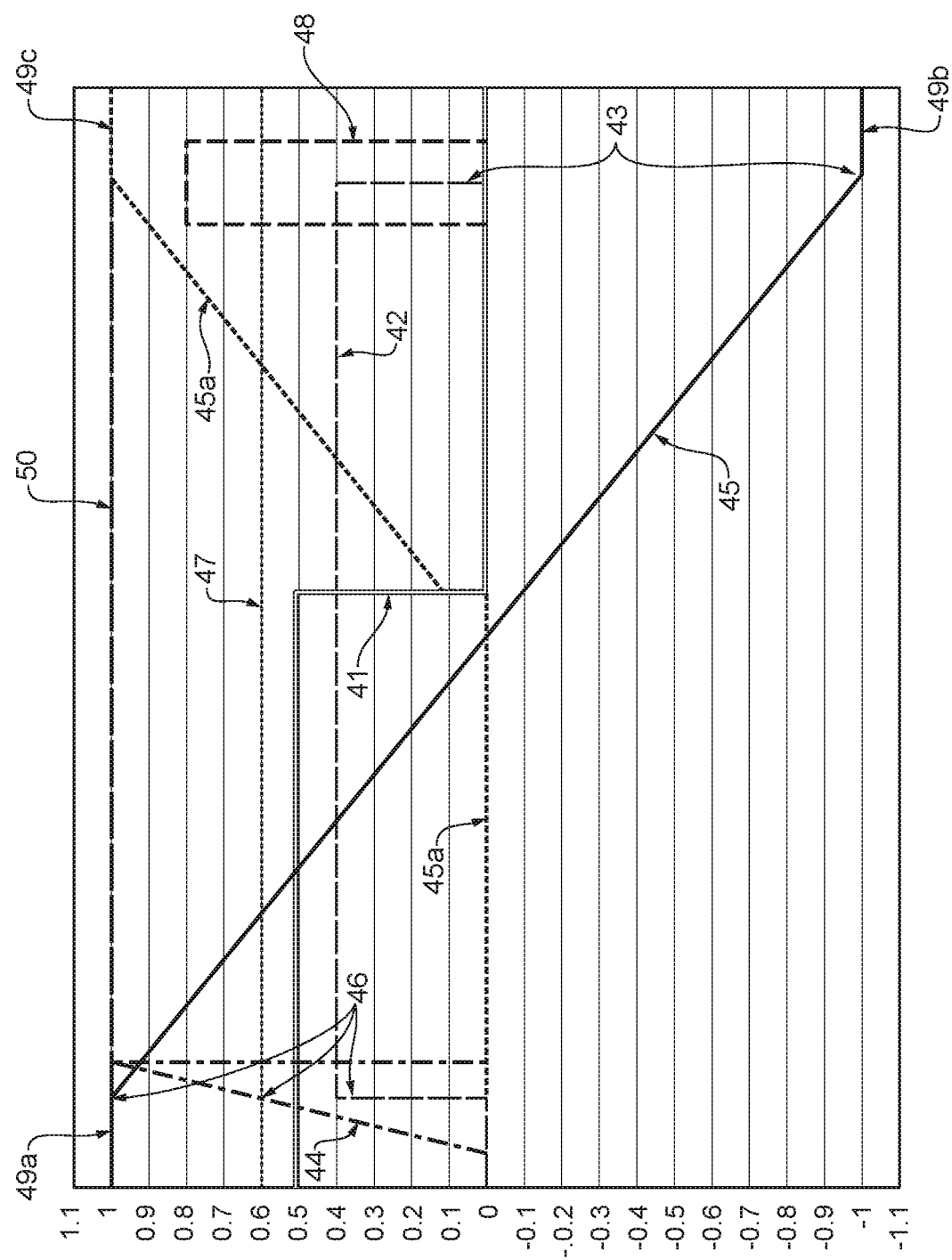
FIG. 4 shows exemplary signal and control waveforms of an embodiment of a metal detector with current-mode control pertinent to the operation of the current control.

An improved transmit operation is described with the aid of FIG. 4. Note that FIG. 4 only shows the waveforms close to a period of rapid change of transmit inductive winding current, and excludes the whole repeating cycle, to aid understanding. With reference to FIG. 4, the transmitted electrical current 49a, 45 and 49b flowing through a transmit inductive winding, includes a period of rapid change of current 45 (when a high voltage is switched across the transmit inductive winding), and constant current periods which comprises a positive polarity constant current period 49a preceding the period of rapid change of current 45, and a negative polarity constant current period 49b following the period of rapid change of current 45. For the sake of simplicity of understanding, the traces 49a, 45 and 49b may represent both the transmit inductive winding electrical current, and simultaneously a voltage proportional to the transmit inductive winding electrical current, or amplified voltage version thereof. The said voltage proportional to the transmit inductive winding electrical current, or amplified voltage version thereof, may instead only be "valid" for the latter part of the period of rapid change of current flowing through the transmit inductive winding, with a change sign. For example, trace 45a and 49c (which equals to −49b), could represent an amplified voltage measured across a current sensing resistor effectively connected in series with the transmit inductive winding, but with electronics switching affecting the said change of sign and active (or "valid") period: Hence producing "a current sensing voltage" 45a and 49c, wherein this current sensing voltage may be applied as an input signal to transmit signal control feedback loops. The transition time 43, between the period of rapid change of current 45 and the 49b period of constant current, is controlled by a value approximately equal to a value 50 shown in FIG. 4. That is, when the current sensing voltage 45a passes above this value 50, this causes the transmit switching electronics to switch from the high voltage applied across the transmit inductive winding to a low voltage switched across the transmit inductive winding, of such value to cause a constant current to flow though the transmit inductive winding (via Ohms law) during the negative constant current period 49b. Thus, the termination of the period of rapid change of transmit inductive winding current 45, is controlled by a value of the transmit inductive winding current (at time 43), and thus this method of switching control may be thought of as a "current-mode control". A rectangular-wave control signal 41 directs the flow direction through the transmit winding, namely a positive or a negative polarity constant current period, in this case, positive when "high", and negative when "low", and also when the current sensing voltage is active or not.

Figure 5:
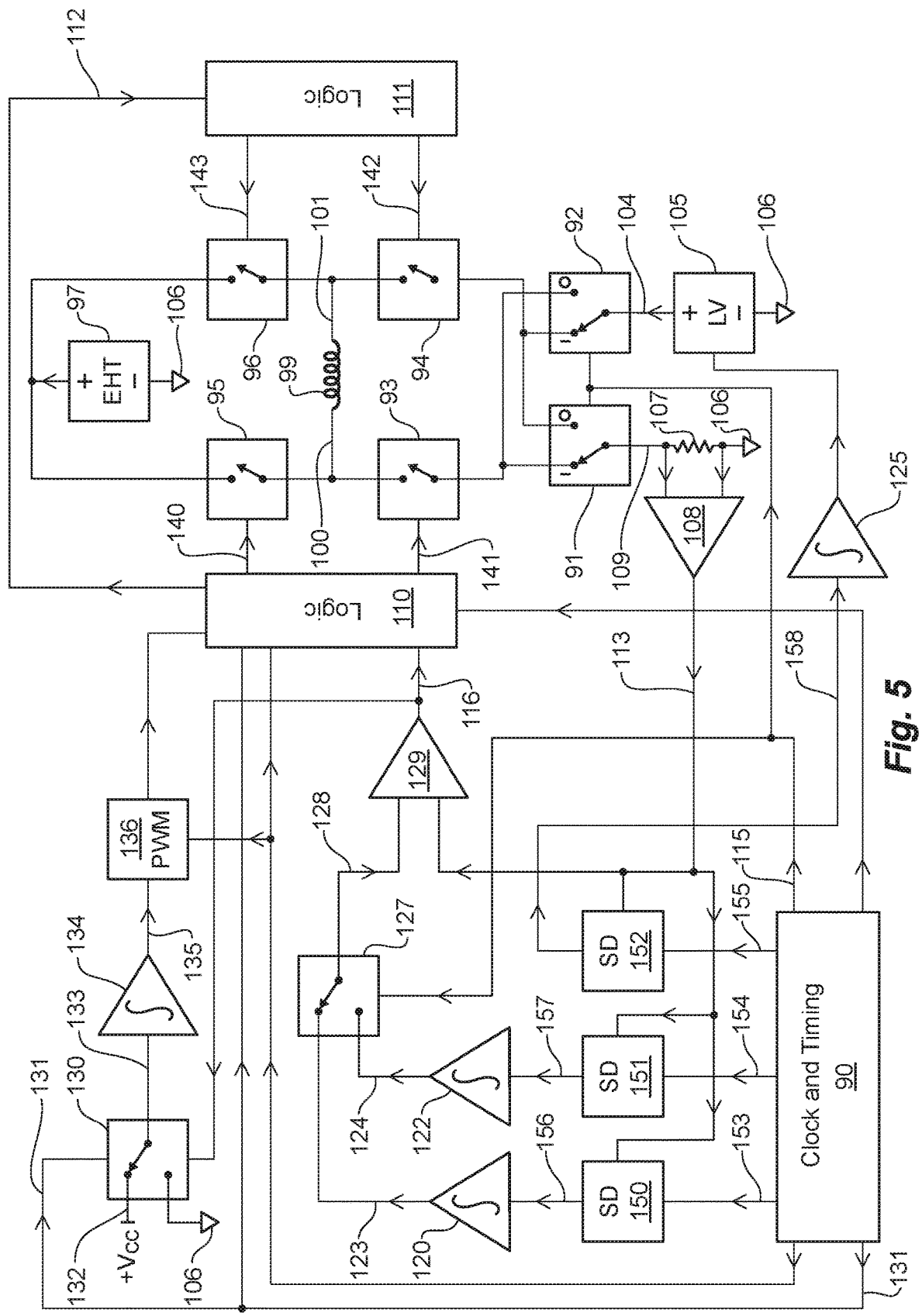
FIG. 5 shows an exemplary transmitter block diagram of a metal detector associated with FIG. 4.

FIG. 5 shows a block diagram of an example arrangement to implement such a system. A clock and timings signal generator 90, controls via connection 115 switches 91 and 92 (such as DPDT switches) to connect current sensing resistor 107 to either switch 93, or switch 94, and a low voltage supply 105 (e.g. 0.75V) to the opposite switch of 93 or 94 to which current sensing resistor 107 is connected. Switch 93 is connected to transmit inductive winding 99 at node 100, and to switch 95. Switch 94 is connected to transmit winding 99 at node 101, and to switch 96. Both switches 95 and 96 are connected to a high voltage supply 97 (e.g. 180V). High voltage supply 97 and current sensing resistor 107 are connected to the system ground 106. Switches 93, 94, 95 and 96 form an "H-bridge", with the low sides either switching to the system ground via resistor 107 (e.g. 50 milliohms) used to sense transmit inductive winding 99 current, via the switches 91 and 92, or, to the low voltage supply 105 to set the mean current in transmit winding 99 during the "approximately constant current" periods (again via the switches 91 and 92).

The signal at 115 generated in the clock and timing signal generator 90 may take the form of the signal 41 in FIG. 4. The voltage across the transmit inductive winding current sensing resistor 107 (between node 109 and system ground 106) is amplified by amplifier 108, whose output 113 is fed to the inputs of synchronous demodulator 150, synchronous demodulator 151 and synchronous demodulator 152. A signal at 113 may be represented as 49a, 45 and 49b in FIG. 4. The synchronous demodulation transfer functions of the synchronous demodulators 150, 151, and 152 are controlled by the clock and timing signal generator 90 at connections 153, 154 and 155 respectively. An output 158 of synchronous demodulator 152 feeds an input of a fourth negative feedback loop integrating amplifier 125, that controls an output voltage at an output 104 of the low voltage supply 105, such that the mean current in transmit inductive winding 99 during the "approximately constant current" periods, is set via this fourth feedback loop, wherein the fourth negative feedback loop effectively includes the H-bridge, the switches 91 and 92, current sensing resistor 107, amplifier 108, synchronous demodulator 152, the fourth negative feedback loop integrating amplifier 125, the transmit inductive winding 99, low voltage supply 105, and high voltage supply 97.

An output 156 of synchronous demodulator 150 feeds an input of a first negative feedback loop integrating amplifier 120, whose output 123 is feeds one input of a switch 127 (such as a SPDT switch). An output 157 of synchronous demodulator 151 feeds an input of a third negative feedback loop integrating amplifier 122, whose output 124 feeds the other input of switch 127. Switch 127 either selects an output 123 of the first negative feedback loop integrating amplifier 120, or, an output 124 of the third negative feedback loop integrating amplifier 122, and this switch 127 selection is controlled by the signal at 115 (waveform 41 in FIG. 4). An output 128 of switch 127 is connected to an input of a comparator 129. The synchronous demodulator 150 is responsive to at least one slope of an approximately constant current period of a first polarity (e.g. negative), within a repeating transmit cycle, and the synchronous demodulator 151 is responsive to at least one slope of an approximately constant current period of a second polarity (e.g. positive), within a repeating transmit cycle. The other input of comparator 129 is the output 113 of the amplifier 108 (waveform 45a in FIG. 4) whose output is an amplified voltage across current sensing resistor 107, that is, a signal proportional to the current flowing though the transmit inductive winding 99. Note that this current is measured by amplifier 108 as being mono-polar (e.g. positive like the waveform 49c in FIG. 4) during the constant current periods, and having the same slope (e.g. positive) during the rapid change of transmit inductive winding current (e.g. the same as waveform 45a in FIG. 4), due to the action of switches 91 and 92. An output 116 of comparator 129 feeds an input of logic 110 that controls switches 93 and 95, and switches 94 and 96 via logic 111, such that when a signal at 113, shown as 45a in FIG. 4, crosses a signal from an output 123 of the first negative feedback loop integrating amplifier 120, shown as level 50 in FIG. 4, then the period of rapid change in transmit winding current 45, terminates and an approximately constant transmit winding current period 49b then ensues. This transition is indicated at time 43 in FIG. 4. Thus, the first negative feedback loop maintains the slope of an approximately constant current period (waveform 49b) to be approximately zero via current-mode control. The signal 42 controls the switching of the H-bridge. Then the same process occurs for the opposite polarity to the above: An output 116 of comparator 129 feeds an input of logic 110 and thence logic 111, that controls switches 94 and 96, such that when a signal at 113 crosses a signal from an output 124 of the third negative feedback loop integrating amplifier 122, then a period of rapid change in transmit winding current terminates, and an approximately positive polarity constant current period ensues. Thus, the third negative feedback loop maintains the slope of an approximately constant current period to be approximately zero for this positive polarity period.

Note that for the benefit of understanding, the current waveform 45 (and corresponding voltage waveform 45a) are not linear as could be suggested by FIG. 4, albeit it is very close to being linear over the period of rapid change of current flowing through the transmit inductive winding. Rather, the response is that of a second order "series LCR" network, assuming the high voltage supply 97 acts approximately as a "storage" capacitor (rather than for example an active linear power supply). Assuming that the high voltage supply 97 is a switch-mode power supply, then this waveform's second-order response is more complex due to transient energy additions to the charge on the said capacitance of the high voltage supply 97, if the said switch mode power supply's energy increase is transferred during the period of rapid change of current flowing through the transmit inductive winding (45). Further, the near-linear slope changes very slightly between when the low voltage supply 105 is switched to the transmit inductive winding, compared to when switched to the current sensing resistor 107, which is determined by waveform 41 (controlling switches 91 and 92).

In summary, in a general form, the transmitter transmits a repeating sequence of transmitted magnetic field into an environment, generated by a repeating sequence of transmitted electrical current flowing through a transmit inductive winding, such that the repeating sequence of transmitted electrical current includes at least a first period of rapid change of current, followed by a first period of non-zero approximately constant current, wherein a transition time between the first period of rapid change of current and the first period of non-zero approximately constant current is controlled by a first value of the electrical current flowing through the transmit inductive winding (current-mode control) during the first period of rapid change of current, wherein the first value is determined by an output of a first negative feedback loop that measures at least part of the repeating sequence of transmitted electrical current flowing through the transmit inductive winding.

To avoid any ambiguity, the phrase "repeating sequence" broadly means exact sequence that may or may not be separated by non-repeating portion. For example, XYZXYZ is a repeating sequence with XYZ sequence repeating.

The term "non-zero" means a finite number excluding zero. Accordingly, the term "non-zero approximately constant current" means that the current during a period is of a certain non-zero value, and the non-zero value deviates very slightly. In one interpretation, the deviation or slope is within 1%. The term "rapid" is a relative term. However, it would be understood by a person skilled the art that the term "rapid" is comparing the rate of change of current during the first period of rapid change of current with the rate of change of current during a first period of constant current. In the event of any ambiguity, not conceded, rapid would mean the rate of change of current during the first period of rapid change of current is at least 100 times the rate of change of current during a first period of constant current.

The first value may take the form of a voltage value, or a current value.

In one form, the first negative feedback loop measures at least part of a slope of the first period of non-zero approximately constant current.

Periods of rapid change in transmit winding current have to be positioned relative to the signals from the clock and timing signal generator 90, that generates all of the synchronous demodulation transfer functions, including receive related ones, so that the transitions between the periods of rapid change of transmit inductive winding current, and the following constant current periods, remain approximately constant relative to the receive signal synchronous demodulators transfer functions. To achieve this, at least a second negative feedback loop is provided, and is formed via switch 130, a second negative feedback loop integrating amplifier 134, a pulse width modulator 136, and the H-bridge and related circuitry. The switching position of switch 130 is controlled by the output 116 of the comparator 129, such as the transition at time 43 in FIG. 4. An enable action of switch 130 is controlled by a signal at 131 shown as waveform 48 in FIG. 4. When 48 is low, switch 130 is disabled, and the switch resistance is effectively "infinite." Switch 130 selects either a logic high 132 or logic low 106 (electronics ground) when enabled (when trace 48 of FIG. 4 is high). The output 133 of switch 130 feeds an input of the second negative feedback loop integrating amplifier 134, whose output 135 in turn feeds an input of the pulse width modulator 136 and is shown as a voltage 47 in FIG. 4. The pulse width modulator 136 includes a ramp generator whose signal is shown as 44 in FIG. 4. When 44 crosses voltage level 47 at time 46, a period of approximately constant transmit winding current 49a terminates, and a period of rapid change in transmit winding current 45 commences. The second negative feedback loop acts to centre time 43 within the logic pulse 48, thereby setting the termination of the period of rapid change in transmit winding current 45 relative to the system clock within the clock and timing signal generator 90. It should be noted that the actions of the first, second and third negative feedback loops are relatively independent, and thus, this system is capable of well-supporting multiperiods of approximately constant current within a repeating transmit signal sequence. In contrast, for the prior art, a termination current of one rapid change of transmit inductive winding current period affects the slope of future approximately constant current periods, thereby entangling control of opposite polarity periods, including multi-periods (including feedback loops controlling the slopes of these periods).

Thus, in one form, a second negative feedback loop controls a commencement of at least the first period of rapid change of current, such that the termination of the first period of rapid change of current is controlled to be in a fixed relationship to a timing clock controlling at least one receive synchronous demodulator that receives a receive signal from a receiver of the metal detector. This fixed relationship is maintained even if the period of rapid change of current changes in duration.

In another form, the repeating sequence of transmitted electrical current flowing through a transmit inductive winding includes at least two different periods of approximately constant current, each being of different duration. In one form, they can be of the same duration.

FIG. 4 shows that the termination of the approximately constant current period 49a and commencement of a period of rapid change in transmit winding current 45, is coincident with the ramp 44 crossing the second negative feedback control voltage 47 (that causes a transition in waveform 42 at time 46). This signal sequence diagram in FIG. 4 does not include showing the electronic propagation delays for the sake of simplicity of understanding. Likewise, the propagation delays at time 43 are not shown for the same reason. The logic 110 and the logic 111 are connected to controls of the H-bridge switches at connections 140, 141, 142 and 143.

Alternatively, the termination of the approximately constant current period 49a and commencement of a period of rapid change in transmit inductive winding current 45 may be fixed, and the second negative feedback loop may instead acts to centre time 43 within the logic pulse 48, by modulating the output voltage of the high voltage supply voltage 97. This is possible because $$i_f = i_0 + \frac{1}{L(t)} \int_0^{\tau_f} v\, dt,$$

and thus changing v can compensate for a change in transmit winding inductance L (t) whilst keeping the initial current, $i_0$, the final current $i_f$, and the termination time $t_f$, constant.

The reason for having at least two negative feedback loops maintaining the slopes of the approximately constant current periods, at least one for each polarity, is because the fourth feedback loop action is typically relatively slow and the "on" resistances and propagation delays of the H bridge and switches 91 and 92 vary due to the manufacturing process. Thus, Ohms law implies that the current of each polarity's constant current periods typically will be different to each other.

Figure 6:
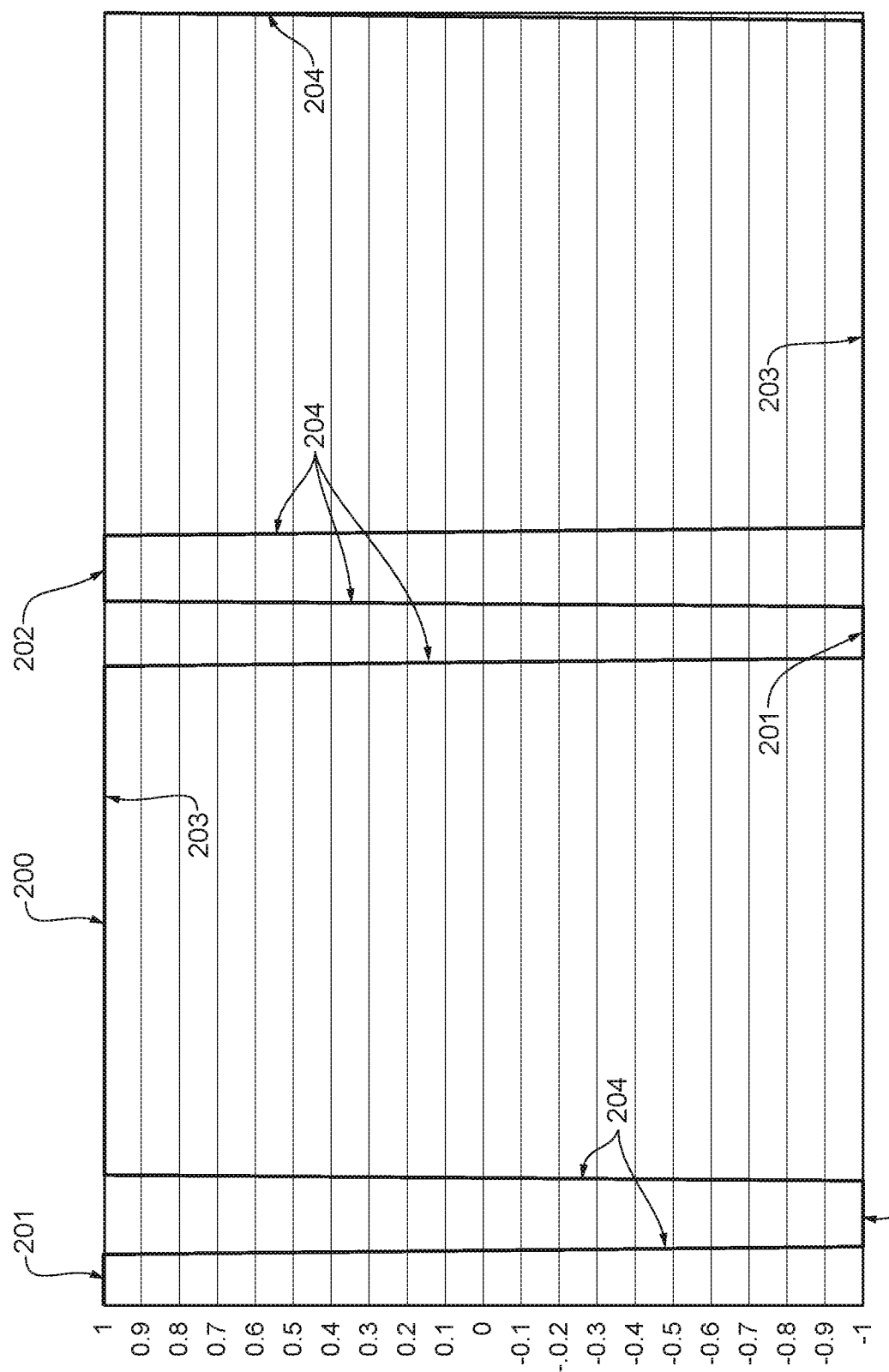
FIG. 6 shows exemplary multi-period transmit conductor waveform.

With reference to FIG. 6 that shows an example of one fundamental period of multi-period constant current periods 200 (that are repeated; the repetition not being shown) of a transmit inductive winding current: This fundamental period consists of three sequential different duration constant current periods that are then transposed in sign (six constant current periods in total per fundamental period). These consist of alternating periods of rapid change in transmit inductive winding current 204, and periods of constant current 201, 202 and 203. Namely, these consist of: The shortest constant current periods 201, one positive, the other negative, slightly longer short periods of constant current 202, one negative and one positive, and long periods of constant current 203, one positive and one negative, per fundamental period. FIG. 4 shows a single "magnified" negative slopped period of rapid change in transmit inductive winding current 204. The left-hand side of FIG. 6 immediately repeats following the termination of the righthand period of rapid change of transmit inductive winding current. One skilled in the art will understand that numerous different combinations of different periods are possible within a fundamental period, and that these need not have any sort of symmetry per fundamental period.

Those of skill in the art would understand that information and signals may be represented using any of a variety of technologies and techniques. For example, data, instructions, commands, information, signals, bits, symbols, and chips referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form, the disclosure may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It will be understood that the terms "comprise" and "include" and any of their derivatives (e.g. comprises, comprising, includes, including) as used in this specification is to be taken to be inclusive of features to which the term refers, and is not meant to exclude the presence of any additional features unless otherwise stated or implied.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A method to detect a target using a metal detector, the method comprising:
   transmitting a repeating sequence of transmitted magnetic field into an environment, the repeating sequence of transmitted magnetic field is generated by a repeating sequence of transmitted electrical current flowing through a transmit inductive winding such that the repeating sequence of transmitted electrical current comprises at least a first period of rapid change of current, followed by a first period of non-zero approximately constant current;
   wherein a transition time between the first period of rapid change of current and the first period of non-zero approximately constant current is controlled by comparing a first value to a signal representative of an electrical current flowing through the transmit inductive winding that is measured during the first period of rapid change of current; and
   wherein the first value is determined by an output of a first negative feedback loop that measures at least part of the repeating sequence of transmitted electrical current flowing through the transmit inductive winding.

2. The method of claim 1, wherein the first negative feedback loop measures at least part of a slope of the first period of non-zero approximately constant current.

3. The method of claim 1, wherein a second negative feedback loop controls a commencement of at least the first period of rapid change of current, such that a termination of the first period of rapid change of current is controlled to be in a fixed relationship to a timing clock controlling at least one receive synchronous demodulator that receives a receive signal from a receiver of the metal detector.

4. The method of claim 1, wherein the repeating sequence of transmitted electrical current flowing through the transmit inductive winding comprises at least two different periods of approximately constant current, each being of different duration.

5. The method of claim 2, wherein a second negative feedback loop controls a commencement of at least the first period of rapid change of current, such that a termination of the first period of rapid change of current is controlled to be in a fixed relationship to a timing clock controlling at least one receive synchronous demodulator that receives a receive signal from a receiver of the metal detector.

6. The method of claim 2, wherein the repeating sequence of transmitted electrical current flowing through the transmit inductive winding comprises at least two different periods of approximately constant current, each being of different duration.

7. A metal detector configured to perform the method of claim 1.

8. A metal detector configured to perform the method of claim 2.

9. A metal detector configured to perform the method of claim 3.

10. A metal detector configured to perform the method of claim 4.

11. A metal detector configured to perform the method of claim 5.

12. A metal detector configured to perform the method of claim 6.

13. A non-transitory computer readable medium comprises instructions, wherein when the instructions are executed, the method of claim 1 is performed.

14. A non-transitory computer readable medium comprises instructions, wherein when the instructions are executed, the method of claim 2 is performed.

15. A non-transitory computer readable medium comprises instructions, wherein when the instructions are executed, the method of claim 3 is performed.

16. A non-transitory computer readable medium comprises instructions, wherein when the instructions are executed, the method of claim 4 is performed.

17. A non-transitory computer readable medium comprises instructions, wherein when the instructions are executed, the method of claim 5 is performed.

18. A non-transitory computer readable medium comprises instructions, wherein when the instructions are executed, the method of claim 6 is performed.

* * * * *